March 24, 1925.
F. P. BARRAVECCHIA
1,531,062
AUTOMOBILE LOCKING DEVICE
Filed Sept. 19, 1922   2 Sheets-Sheet 1
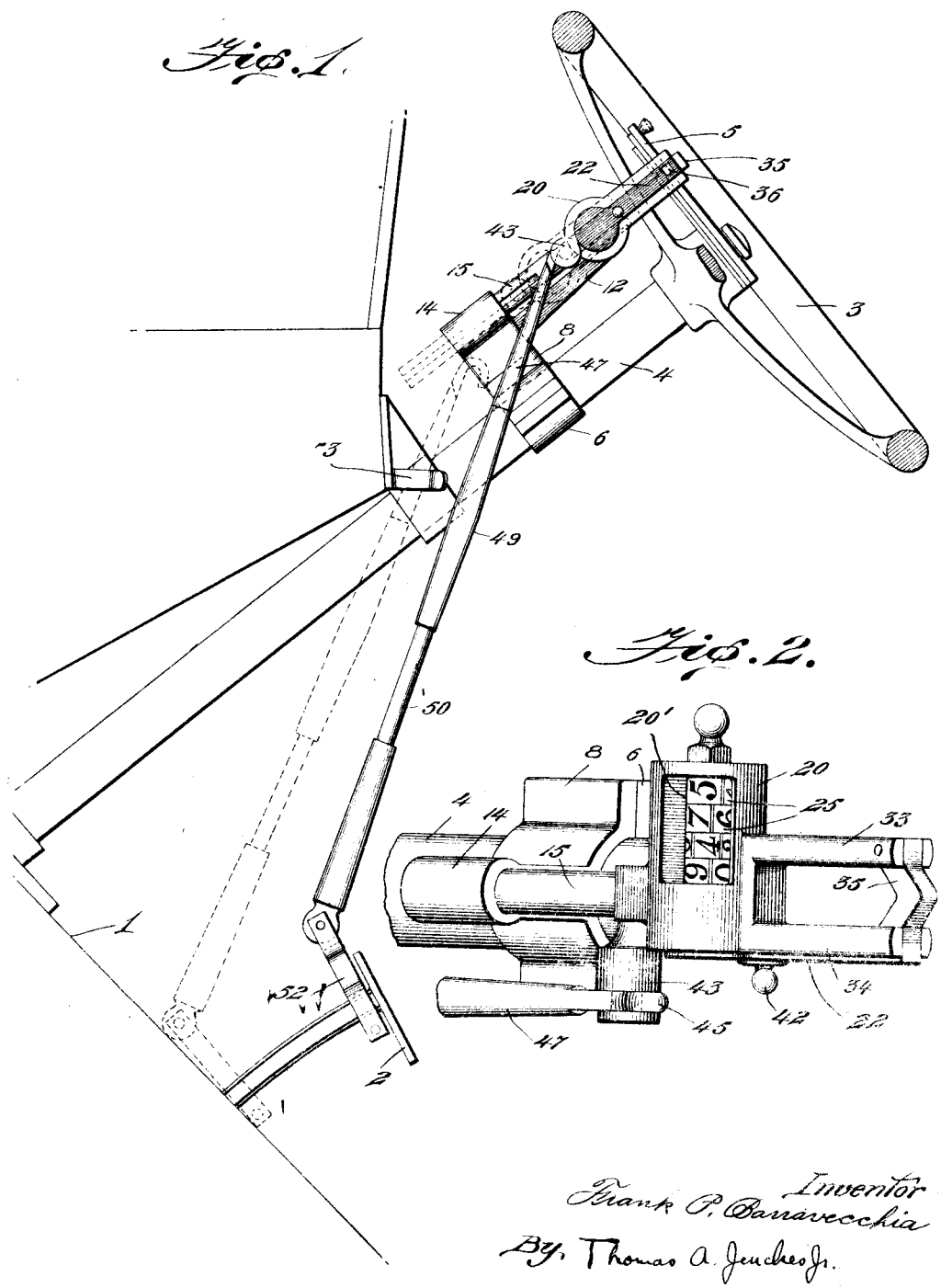

March 24, 1925.
F. P. BARRAVECCHIA
AUTOMOBILE LOCKING DEVICE
Filed Sept. 19, 1922  2 Sheets-Sheet 2
1,531,062
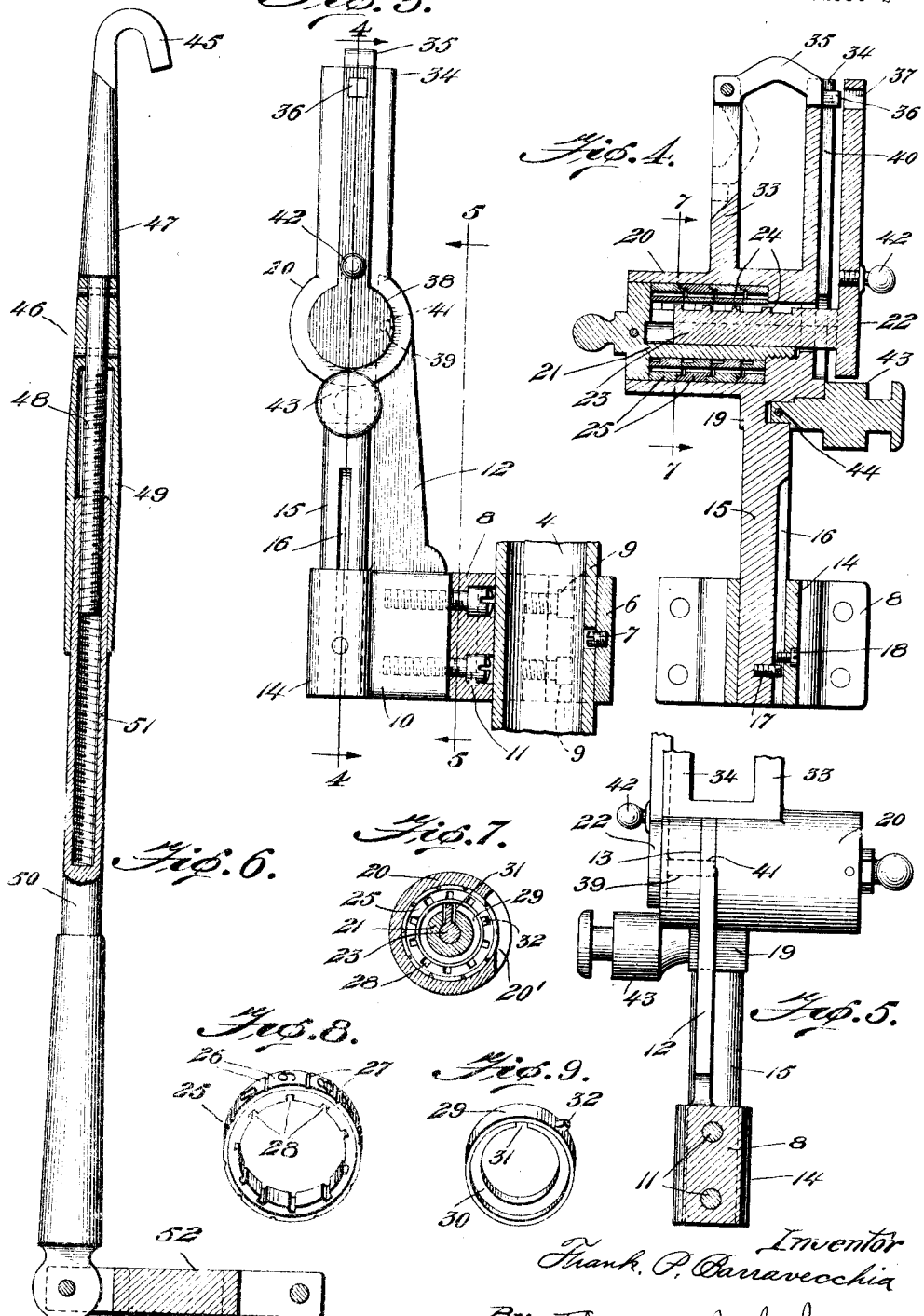

Patented Mar. 24, 1925.

1,531,062

UNITED STATES PATENT OFFICE.

FRANK PAUL BARRAVECCHIA, OF WESTERLY, RHODE ISLAND.

AUTOMOBILE LOCKING DEVICE.

Application filed September 19, 1922. Serial No. 589,129.

*To all whom it may concern:*

Be it known that I, FRANK PAUL BARRAVECCHIA, a citizen of the United States, residing at Westerly, in the county of Washington and State of Rhode Island, have invented certain new and useful Improvements in Automobile Locking Devices, of which the following is a specification.

My invention relates to an improvement in automobile locking devices of the type in which a specially constructed lock firmly attached to the steering wheel, at the same time, holds the clutch foot lever against movement, and also secures the steering wheel and control levers against turning movement, both by means of a latch and by means of arms vertically raised and secured in a locked position, thereby preventing unauthorized persons from operating same.

One object of the invention is to provide a lock which may be easily attached to the usual steering post, and which may be readily adjusted to fit any type of automobile desired, and which when once attached, continues to remain a part of the automobile. It will be seen that this lock may be transferred to any type of automobile.

A further object of the invention is to construct a locking element which may be readily moved out of engagement with the clutch, steering wheel and control levers when the device is out of use.

A further object of the invention is to provide a combination lock which is always attached to the automobile and which at any time may be operated without the use of a key.

A further object of the invention consists of the simultaneous locking of the clutch, control levers and the steering wheel, thus making it practically impossible to drive or even to tow the machine.

A further object of the invention aims at the provisions of a steering wheel, control lever and clutch lock which is compact, strong, simple, durable and inexpensive to manufacture.

With these and other objects in view which will become apparent as the description proceeds, the invention consists of certain novel features of construction, combination and arrangement of parts hereinafter more fully described and claimed, and illustrated in the accompanied drawings, in which like characters of reference indicate like parts throughout the figures, of which—

Figure 1 is a side elevation partially in section, of the controls of an automobile showing the steering wheel, steering post and clutch pedal—with the locking device in locked position in full lines, and in unlocked position in broken lines.

Figure 2 is a plan view of the lock in locked position viewed from directly above.

Figure 3 is a side elevation partially in section, of the locking device in locked position, showing it attached to the steering post.

Figure 4 is a vertical section taken on line 4—4 of Figure 3.

Figure 5 is a section on the line 5—5 in Figure 3.

Figure 6 is a side elevation partially in section, of the clutch locking rod.

Figure 7 is a cross section along the line 7—7 in Figure 4.

Figure 8 is a detail perspective view of an index ring.

Figure 9 is a perspective view of a locking ring.

1 represents an automobile having the ordinary foot lever 2 for operating the clutch, the ordinary steering wheel 3, comprising the steering wheel proper and the steering post 4, and the ordinary spark and throttle control levers 5.

The clamp cap 6 carries the pin 7, which when the device is in position, is inserted into an aperture provided for that purpose in the steering post 4, and which prevents the locking device from shifting its position. The base clamp 8 is attached to the clamp cap 6 by means of screws 9 (Figure 3). These screws 9 after insertion have their heads removed, thus rendering it difficult to extract them. The base clamp 8 is attached to the base 10 by means of screws 11 inserted from the concave face of the base clamp. By the substitution of other sizes of base clamps for use on different types of automobiles, the distance of the lock from the steering post 4 may be varied. The base arm 12 extends upwardly from the base 10 into a slot 13 provided therefor in the cylindrical housing 20, thus retaining the housing 20 in its proper relative position. The front end of the base 10 is provided with a tubular portion 14 through which slides the supporting rod 15. The supporting rod 15 is provided with a longitudinal groove 16 in the lower end of which is positioned the screw 17. Mounted in the wall of the tubular portion 14 and projecting into the groove 16 is the screw 18, the purpose of which is to provide a limiting stop to co-act with the screw 17 to limit the upward movement of the supporting rod 15. The downward movement of the supporting rod 15 is limited by the base 19 of the supporting rod 15 striking against the upper edge of the tubular portion 14. Formed integral with and at the upper end of the supporting rod 15 is the cylindrical housing 20. The cylindrical housing 20 forms the body of the locking device, is provided with a sight opening 20', and has threaded centrally thereof the hollow shaft 21. A locking member 22 may be secured in closed position by means of any suitable lock. In the construction as shown, the locking member 22 is provided with the arm 23 which, when the device is in locked position, extends into the hollow shaft 21 centrally of the housing 20 and is held in position by means of a combination locking device. On the top of the arm 23, and spaced relative to each other are the locking lugs 24.

The index rings 25 have their outer peripheries divided into ten equal parts 26. Each part 26 is separated by a small indentation 27, and is marked from 0 to 9. On the inner peripheries of the index rings 25 are slots 28 for the various settings placed directly under each numeral on the outer periphery. The locking rings 29 are made to fit inside of the index rings 25, and on their inner peripheries are formed shoulders 30, which extend part way across and retain the locking lugs 24 of the arm 23 of the locking member 22 when in locked position. The shoulders 30 have at a point in their circumference grooves 31, for the passage of the locking lugs 24 when being withdrawn. From the outer periphery of the locking rings 29 project the pins 32 which fit into any of the slots 28 on the inner peripheries of the index rings 25. By inserting these pins 32 into different slots 28, different combinations of the lock may be made.

Extending upwardly from the cylindrical housing 20, and spaced relative to each other are the two parallel arms 33 and 34. Pivotally mounted on the upper end of the arm 33 is the latch 35 which, when the device is in locked position, bridges the space between the arms 33 and 34, as shown in Figure 4, and is designed to enclose therein a spoke of the steering wheel 3 and the control levers 5, as shown in Figure 1. The free end of the latch 35 is provided with a tongue 36 adapted to enter the aperture 37 in the upper end of the locking member 22. The locking member 22 at its lower extremity is shaped in the form of a disk 38 from which extends a pin 39. Thus it will be seen that when the locking member 22 is properly seated and secured in the recess 40 of the arm 34, the pin 39 extends into the aperture 41 in the upper end of the base arm 12, while at the same time the tongue 36 of the latch member 35 is secured in the aperture 37. Thus it will be seen that the locking member performs two locking functions: (1) The retention of the supporting post 15, the cylindrical housing 20, and the parallel locking arms 33 and 34 in their elevated position with the spoke of the steering wheel 3 and the control levers 5 confined therebetween, by means of the pin 39 engaging in the aperture 41. (2) The latch 35, being confined as before described, the spoke of the steering wheel 3 and the control levers 5 are held completely encircled. The locking member 22 is provided with a knob 42 for the convenient withdrawal of the same from its locked position.

The knob 43 is made fast to the cylindrical housing 20 by means of the pin 44, and is adapted to receive the hook 45 of the clutch locking rod 46. From the upper portion 47 of the clutch locking rod 46 extends the threaded rod 48 enclosed by the sleeve 49. From the lower portion 50, extends the hollow rod 51, which is threaded on the inside, into which is screwed the threaded rod 48 of the upper portion 47. By screwing the threaded rod 48 further into the hollow rod 51, adjustment for length of the clutch locking rod 46 may be made. The clutch pedal lock 52 is hinged to the clutch locking rod 46, and by bearing evenly on the bottom of the clutch pedal top prevents the clutch pedal from being pushed down and the clutch from being thrown out. When the lock is in its lowered position, the clutch locking rod 46 may be disengaged from the knob 43, and the clutch pedal lock 52 lowered to the floor, out of the way of the operation of the clutch 2. The clutch locking rod 46 may be inserted in the spring clamp 53 and thus be held in place out of the way of the driver.

Having the lock installed on the steering post of the automobile directly in front of the chauffeur and beneath the steering wheel, to lock the car, set the desired combination on the combination rings, or unlock the lock if other type is used, make sure that the clutch locking rod 46 is attached to the clutch locking rod knob 43, throw open the latch 35 and pull up the cylindrical housing 20 on the base 10 until it stops, catching one of the spokes of the steering wheel 3 and the control levers 5 between the arms 33 and 34. Throw over the latch 35. Push in the locking member 22 catching the tongue 36 of the latch in the aperture 37 and pushing the pin 39 into the aperture 41 in the base arm 12. As the desired combination is set on the index rings 25, the locking lugs 24 on the arm 23 of the locking member 22 pass freely through the grooves 31 of the shoulders 30 of the locking rings 29. Then turn one or more of the index rings 25 locking the combination lock. The movement of the index rings 25 in turn moves the locking rings 29 as the pins 32 of the locking rings 29 fit into the slots 28 in the inner peripheries of the index rings 25. This moves the grooves 31 of the locking rings 29 out of alignment with each other and away from the locking lugs 24 on the arm 23, and the shoulders 30 on the inner periphery of the locking rings 29 now extend across the path of the locking lugs 24 and retain the locking member 22 in locked position. Lock in the usual manner if other type of lock is used. To unlock: Turn the index rings 25 until the desired reading of numbers is visible through the sight opening 20', the locking lugs 24 are now free to pass through the grooves 31 in the locking rings 29, or unlock the lock if other type is used, and by means of the knob 42, pull out the locking member 22 which allows the latch 35 to open up and the entire cylindrical housing 20 to slide down on the base 10 and the base arm 12, releasing the spoke of the steering wheel, the control levers, and dropping the clutch locking rod leaving the clutch pedal free to operate.

Having thus described my invention, what I claim as new and desire to secure as Letters Patent is:

1. In an automobile lock, the combination of a slidable locking structure to engage the steering wheel and the control levers attached to the steering post, and means carried by the clutch pedal for locking engagement with said structure.

2. In an automobile lock, the combination of a slidable lock attached to the steering post, means extending from said lock to engage the steering wheel and control levers, and means extending from said lock to engage the clutch.

3. An automobile lock of the character described, having arms extending upwardly therefrom and a clutch locking extension attached thereto so arranged and adapted that when raised to a locked position the arms engage a spoke of the steering wheel and the clutch locking extension engages the clutch lever and retains it in a locked position.

4. An automobile lock of the character described, having arms extending upwardly therefrom and a clutch locking extension attached thereto so arranged and adapted that when raised to a locked position, the arms engage a spoke of the steering wheel and the control levers, and the clutch locking extension engages the clutch lever and retains it in locked position.

5. A combination automobile lock of the character described, firmly attached to the automobile, having arms extending upwardly therefrom and a clutch locking extension attached thereto, so arranged and adapted that when raised to a locked position, the arms engage a spoke of the steering wheel and the clutch locking extension engages the clutch lever and retains it in a locked position.

6. A combination automobile lock of the character described, firmly attached to the automobile, having arms extending upwardly therefrom and a clutch locking extension attached thereto, so arranged and adapted that when raised to a locked position, the arms engage a spoke of the steering wheel and the control levers, and the clutch locking extension engages the clutch lever and retains it in locked position.

7. An automobile lock of the character described, slidably adjustable on a base attached to the steering post, and so constructed that when raised to a locked position, its upwardly extending arms engage a spoke of the steering wheel and the control levers, and are held in position by a pin in the locking member, which engages an aperture in the base arm, the upwardly extending arms being provided with a latch member pivotally attached thereto which, when the device is locked, encircles a spoke of the steering wheel and control levers.

8. An automobile lock of the character described, containing locking means for holding upwardly extending arms in raised position, which arms engage a spoke of the steering wheel and the control levers, and an additional locking member pivotally attached to one arm adapted to encircle a spoke of the steering wheel and the control levers and to be retained in locked position in an aperture in the other arm.

9. A combination automobile lock of the character described, containing locking means for holding upwardly extending arms in raised position, which arms engage a spoke of the steering wheel and the control levers, and an additional locking member pivotally attached to the upper extremity of one arm adapted to encircle a spoke of the steering wheel and the control levers and to be retained in locked position in an aperture in the upper extremity of the other arm.

10. An automobile lock of the character described, which comprises a base firmly attached to the steering post, a housing slidably mounted on said base, arms extending upwardly from said housing, a locking member, locking means, a pin in the locking member which, when the latter is locked, engages an aperture in an arm extending upwardly from the base, a latch connecting the top of said arms, the free end of which is adapted to fit into an aperture in the locking member when the latter is in locked position, and a clutch locking rod attachable to the housing, which has pivoted at its lower extremity a locking member, which when the locking rod is raised to its locked position, engages the clutch lever and holds it fast.

11. An automobile lock of the character described, comprising means for engaging a spoke of the steering wheel and the control levers, means for engaging the clutch pedal and holding it fast, and a combination locking mechanism comprising a body portion, a locking member, means for retaining the locking member in locked position, and means for setting various combinations.

In testimony whereof I affix my signature.

FRANK PAUL BARRAVECCHIA.